(12) United States Patent
Zelenak

(10) Patent No.: US 10,753,414 B2
(45) Date of Patent: Aug. 25, 2020

(54) VEHICLE WHEEL WITH COOLING APPARATUS

(71) Applicant: Claus Ettensberger Corp., West Los Angeles, CA (US)

(72) Inventor: Gergö Zelenak, Rheinstetten (DE)

(73) Assignee: CLAUS ETTENSBERGER CORP., West Los Angeles, CA (US)

( * ) Notice: Subject to any disclaimer, the term of this patent is extended or adjusted under 35 U.S.C. 154(b) by 97 days.

(21) Appl. No.: 15/916,485

(22) Filed: Mar. 9, 2018

(65) Prior Publication Data

US 2019/0277358 A1   Sep. 12, 2019

(51) Int. Cl.
  *F16D 65/847* (2006.01)
  *F16D 65/12* (2006.01)
  *B60B 21/10* (2006.01)
  *B60T 5/00* (2006.01)

(52) U.S. Cl.
  CPC ............ *F16D 65/847* (2013.01); *B60B 21/10* (2013.01); *F16D 65/128* (2013.01); *B60T 5/00* (2013.01)

(58) Field of Classification Search
  CPC ..... F16D 65/847; F16D 65/128; B60B 21/10; B60B 21/102; B60B 21/104; B60B 21/106; B60B 19/10
  USPC ....................................................... 301/6.3
  See application file for complete search history.

(56) References Cited

U.S. PATENT DOCUMENTS 2,022,041 A * 11/1935 Kliesrath ................ B60B 19/10
                                                                        301/6.7

FOREIGN PATENT DOCUMENTS

DE      3345476 A1 *   6/1985     ............ B60B 19/10
DE      3737243 A1 *   5/1988     ............ B60B 19/10
FR      2986468 A1 *   8/2013
GB      1526046 A  *   9/1978     ............ B60B 3/06

* cited by examiner

*Primary Examiner* — Kip T Kotter
(74) *Attorney, Agent, or Firm* — Schmeiser, Olsen & Watts LLP

(57) ABSTRACT

An integrally formed wheel for cooling a brake assembly of a vehicle, comprising a barrel for mounting a tire thereon, a center disc, and a plurality of spokes. The barrel extends from an outboard face to an inboard rim edge and defines a chamber radially inside the barrel. The chamber is located adjacent a brake mechanism when the wheel is on a vehicle. The center disc has a center bore and a plurality of lug holes. A plurality of spokes interconnects the center disc to the barrel. A plurality of cooling passageways is integrally formed with the barrel, the spokes and the center disc. The plurality of passageways is disposed circumferentially around the spokes and extend from the outboard face to a location inside the barrel to direct air into the chamber through the passageways when the wheel is in rotation.

20 Claims, 3 Drawing Sheets

VEHICLE WHEEL WITH COOLING APPARATUS

BACKGROUND OF THE INVENTION

Technical Field

This invention relates to a method and apparatus for cooling a wheel end assembly and particularly for cooling a brake assembly.

Description of Related Art

Brake systems for vehicles and other equipment with rotating wheels now widely include brake disks, which are located behind the wheel disk where they are attached to the wheel hub and fitted with brake lining. During braking, intense friction between the brake disk and the respective friction lining creates a significant amount of thermal energy, which causes a significant increase in temperature, especially of the brake disk. Excessive increase in temperature can cause serious defects of the brake system, which also reduces the operational safety of the vehicle or the given equipment operation. It may result in shape distortion and even warping of the brake disk, brake disk rupture or melting. Fixing these defects or their prevention is connected with the need to replace brake disks, brake lining, etc., which represents a considerable cost, time burden and the need for a temporary decommissioning. Therefore, the brake disk cooling issues received considerable attention.

Formula One, racing cars, and sports cars are vehicles in which this issue is particularly significant. For these types of transport means, the operating temperature when braking from high speed reaches up to 1000° C., and thus the need for fast and high quality cooling of brake disks is urgent. This is specific equipment, in which case repair may be performed only by dedicated specialized workplaces, and it is therefore necessary either to get supplementary service center, or drive off long distances for repairs, which increases cost and time requirements for the owner or the operator of these means of transport. Shutdown of operation here is particularly undesirable, and the need for reliability even in extreme loads is particularly Wheel covers have also been proposed to direct air flow toward a brake assembly for cooling purposes. But, these wheel covers are unreliable, difficult to assemble onto a wheel, and are poor conductors of air toward brake assemblies.

SUMMARY OF THE INVENTION

The above-mentioned disadvantages are eliminated to a considerable extent by the proposed invention.

An integrally formed wheel for cooling a brake assembly of a vehicle, comprising a barrel for mounting a tire thereon, a center disc, and a plurality of spokes. The barrel extends from an outboard face to an inboard rim edge and defines a chamber radially inside the barrel. The chamber is located adjacent a brake mechanism when the wheel is on a vehicle. The center disc has a center bore and a plurality of lug holes. A plurality of spokes interconnects the center disc to the barrel. A plurality of cooling passageways is integrally formed with the barrel, the spokes and the center disc. The plurality of passageways is disposed circumferentially around the spokes and extend from the outboard face to a location inside the barrel to direct air into the chamber through the passageways when the wheel is in rotation.

BRIEF DESCRIPTION OF DRAWINGS

The invention is illustrated using drawings, where.

DETAILED DESCRIPTION OF THE INVENTION

Figure 1:
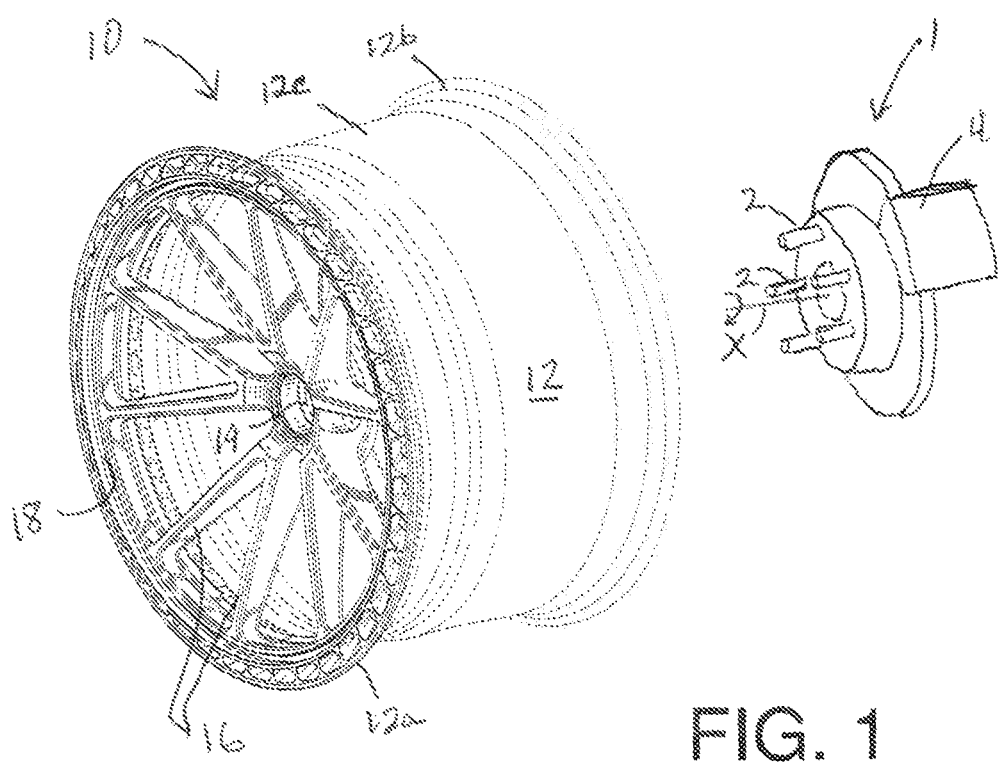
FIG. 1 illustrates an exploded view of exemplary wheel end assembly utilizing the vehicle wheel integrally formed with the cooling system according to this invention.
Figure 2:
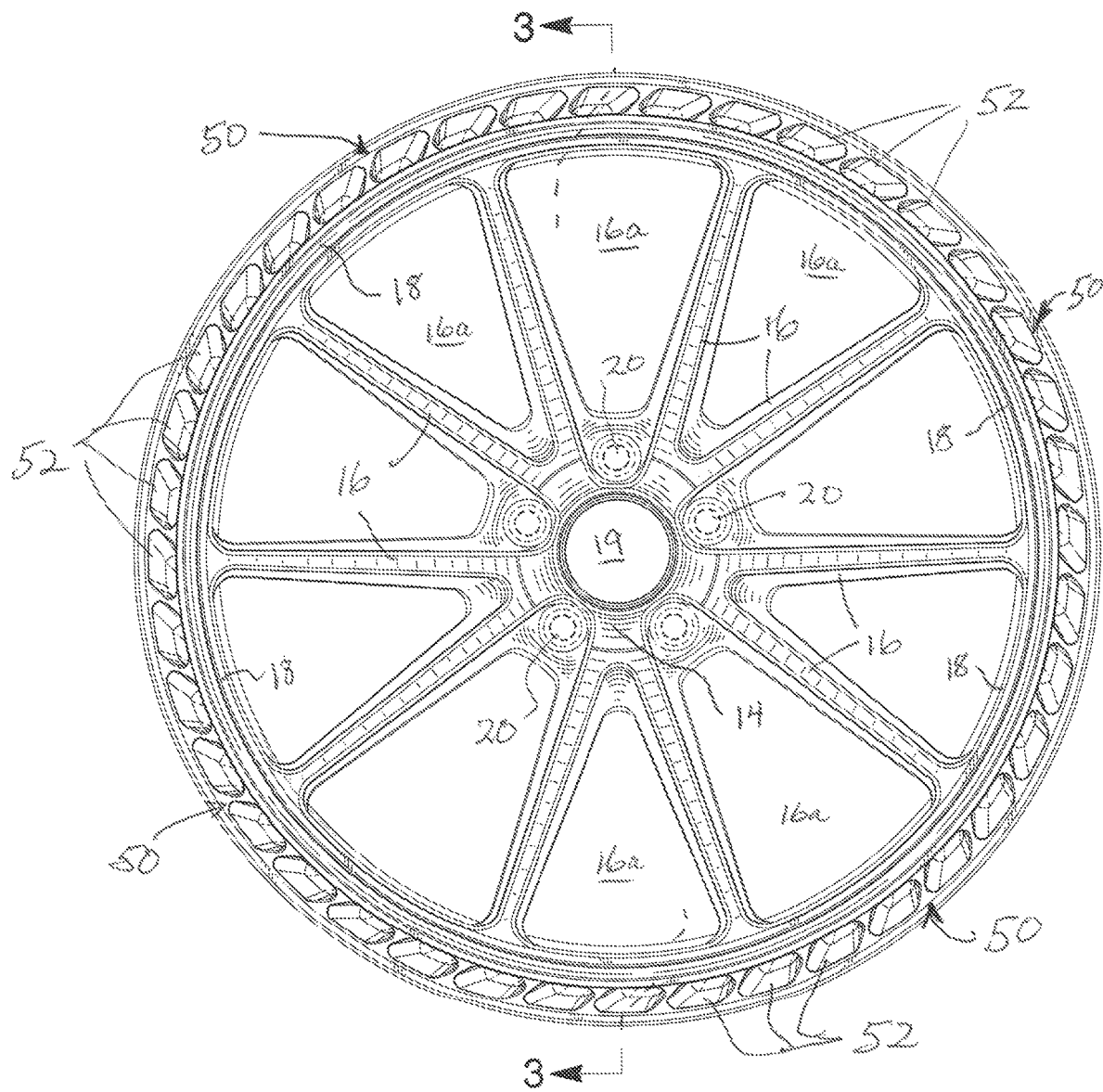
FIG. 2 illustrates a front view of the vehicle wheel integrally formed with a cooling system according to the present invention.
Figure 3:
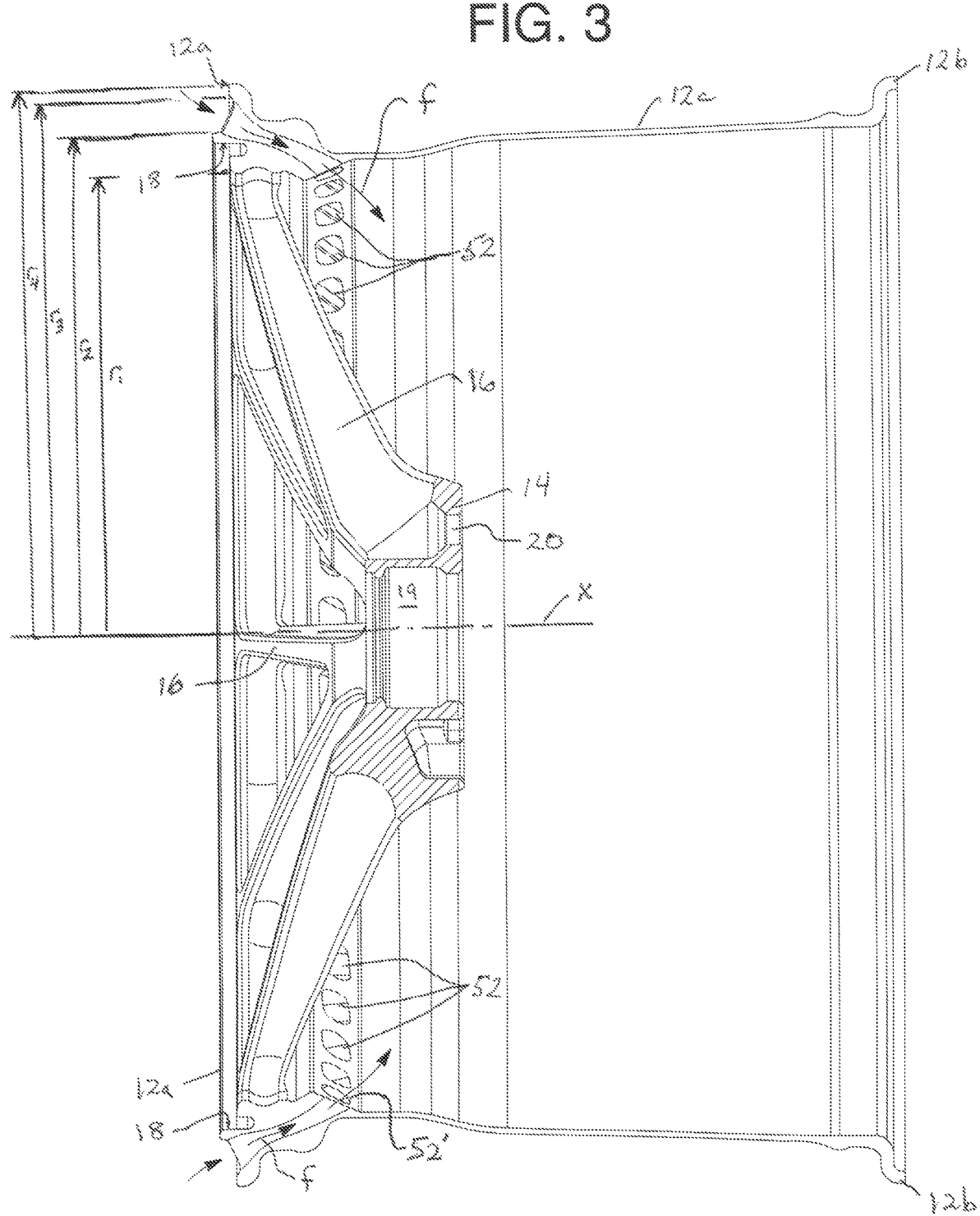
FIG. 3 illustrates a cross sectional view of the vehicle wheel of FIG. 2 as taken along section line 3-3 of FIG. 2.

Example of embodiment of the invention in the preferred embodiment are shown according to FIGS. 1 to 3 but the present invention is not intended to be limited by these drawings. The scope and protection afforded this invention is limited only by the spirit and scope of the claims appended hereto.

The invention is now described, by way of an example, with reference to the accompanying diagrammatic drawings, in which: FIG. 1 shows a perspective front view of a wheel end assembly in exploded view, according to this invention; and FIG. 2 shows a front view of the wheel of FIG. 1.

Referring to the drawings, a wheel, in accordance with the invention, is generally indicated by the reference numeral 10. The wheel 10 comprises a barrel 12 which is the section between the outboard face 12a and inboard rim 12b and features the tire mounting structures between the face 12a and rim 12b such as the drop center 12c and further includes outboard/inboard flanges. As with most conventional wheels, the wheel 10 includes a center disc 14, spokes 16, an outer lip 18, center bore 19, and lug holes 20.

The center disc 14 (see FIG. 2) is a portion of the wheel that consists of the spokes and the axle mounting pad which its depth in relation to the wheel center line is the wheel offset. The spokes 16 are the structure between the axle mounting pad in the center disc and the outer edge of the wheel. The outer lip 18 is the area between the center disc and the outer edge of the wheel. Typically, the wider the wheel the deeper the lip where the deepest lip being provided in "deep dish" wheels.

The center bore 19 is the opening in the back of the wheel that centers the wheel on the hub of the car along a central axis of rotation 'x' of the wheel. Most wheel have a large center bore 19 to fit different vehicles.

The lug holes 20 are openings where the lugs 2 are inserted during wheel installation. Wheels typically have 4, 5, 6 or 8 lugs holes forming a variety of bolt patterns which will be understood by those of skill in the art who would also understand the structure of the wheel end assembly 1 of FIG. 1 which includes lugs 2 and a brakes assembly 4.

Those of skill in the art will appreciate that the wheel 10 will also be formed with a valve stem which is a universal mechanism to inflate tires and may include integrated tire pressure monitoring systems which are now federally mandated for all vehicles, and a center cap, which is a removable part that covers the center bore 19 of the wheel on the outer face. The center cap may be formed to cover the lugs bolts for style and protection. Those features are not illustrated but are known to skilled artisan.

Turning now to FIG. 2, the novel cooling system of the present invention will now be described. As shown in FIG. 2, the wheel 10 includes a center bore 19, spokes 16 and outer lip 18. Additionally, the present invention provides an integrally formed cooling system 50 in the form of cooling passageways 52 circumscribing the outer lip 18. The cooling passageways 52 are a plurality of openings, tunnels and/or passages sized and formed to direct air flow through the passageways 52, which terminate at an inner opening directing air flow toward the brake assembly 4 of the wheel end assembly 1 shown by way of example in FIG. 1. In a preferred embodiment, a profile of the apertures leading into the passageways 52 is substantially oval as shown in FIG. 2.

The passageways and apertures 52 define vane formations that direct flow 'f' of air (see FIG. 3) through the passageways 52 from the external side of the wheel 10 to the internal side upon rotation of a wheel on to which the cooling system 50 is formed, i.e. during vehicle motion. The passageways 52 are preferably angled with respect to the axis x defined by the center bore and curved toward both the circumferential direction and the axial direction as shown in FIGS. 2 and 3. The amount of angle and curvature of the passageways 52 will define the amount of angular rotation imparted to the air being drawn into the wheel by the passageways 52.

The apertures leading to the passageways 52 are preferable positioned to maximize the introduction of air into the passageways 52 and the angle of the passageways 52 defines an impeller for directing air toward the inner chamber within the barrel 12 of the wheel 10. As shown in FIG. 3, the passageways 52 extend from the external face of the wheel 10 at a location radially outside the spokes 16 to maximize air flow 'f' toward the brake system 4. Because the passageways 52 are disposed radially outside the spokes, the rotational speed of the passageways 52 is higher than the rotational speed of the spokes 16. As illustrated, the passageways are asymmetrical as opposed to the spokes 16 which are symmetrical. In other words, the spokes 16 when viewed along the axis of rotation 'x' (see FIG. 2) are symmetrical, while the passageways 52 are asymmetrical. The passageways 52 may be uniformly disposed about the outer circumference of the wheel or the passageways 52 may be randomly disposed with different shapes.

In the embodiment of FIGS. 1-3, the size of the passageways 52 is relative small (less than 20%) of the size of the spokes 16 and their respective openings 16a therebetween. In an alternate embodiment, the passageways 52 are enlarged to define secondary spokes when enlarged to provide more airflow. In such an alternate embodiment, the invention would provide a first inner set of spokes 16 having a symmetrical configuration, while the enlarged passageways 52 would provide a second outer set of spokes defined by the structure between each individual passageway 52 and having an asymmetrical configuration to drawn air toward the brake system 4.

As shown in FIG. 3, the spokes 16 are formed with a radius r1, while the passageways 52 have an aperture or opening defined by inner radius r2 and outer radius r3. The terminal edge of the outboard face 12a has a radius of r4. It is noted that, while the external opening of the passageways 52 (at the external face of the wheel 10) is disposed radially outside the outer lip 18 and the spokes 16 (i.e., r2 and r3 are greater than r1 and outside of the outer lip 18), the internal opening defined by the passageways 52 (called out as 52' in FIG. 3) is radially inside the outer lip 18 has at least a portion that is radially inside of the outer radius (r1) of the spokes 16. In additional being angled toward the central axis of rotation 'x', the passageways 52 are angled around the circumference of the wheel 10. It is noted that the cross section of the passageways 52 shown in FIG. 3 has been simplified to clarify the structure of the passageways 52; however, the illustration of FIG. 3 does not accurately reflect the curved nature of the passageways 52 in order that the passageways 52 can be viewed in this figure. The true shape of the passageways 52 is serpentine in nature.

Notably, the cooling system 50 is integrally formed as a part of the wheel according to known manufacturing methods discussed below as opposed to prior art system that provide separate cooling components mounted to the wheel of brake system. Thus, the cooling system 50 of the present invention does not require additional assembly and provide a maintenance-free system for brake cooling. The different methods of manufacturing the wheels according to the present invention will now be described.

Alloy wheels are wheels that are made from an alloy of aluminum or magnesium. Alloys are mixtures of a metal and other elements. They generally provide greater strength over pure metals, which are usually much softer and more ductile. Alloys of aluminum or magnesium are typically lighter for the same strength, provide better heat conduction, and often produce improved cosmetic appearance over steel wheels. Although steel, the most common material used in wheel production, is an alloy of iron and carbon, the term "alloy wheel" is usually reserved for wheels made from nonferrous alloys.

The earliest light-alloy wheels were made of magnesium alloys. In the mid-to-late 1960s, aluminum-casting refinements allowed the manufacture of safer wheels that were not as brittle. Until this time, most aluminum wheels suffered from low ductility, usually ranging from 2-3% elongation. Because light-alloy wheels at the time were often made of magnesium (often referred to as "mags"), these early wheel failures were later attributed to magnesium's low ductility, when in many instances these wheels were poorly cast aluminum alloy wheels. Once these aluminum casting improvements were more widely adopted, the aluminum wheel took the place of magnesium as low cost, high-performance wheels for motorsports.

A sizable selection of alloy wheels is available to automobile owners who want lighter, more visually appealing, rarer, and/or larger wheels on their cars. Although replacing standard steel wheel and tire combinations with lighter alloy wheels and potentially lower profile tires can result in increased performance and handling, this doesn't necessarily hold when increasingly large wheels are employed.

Magnesium wheels were the first die-cast wheels produced, and were often referred to as simply "mag wheels." Magnesium wheels were originally used for racing, but their popularity during the 1960s led to the development of other die-cast wheels, particularly of aluminum alloys.

Production method for the wheels of this invention vary depending on the intended use, performance and cost. Forging can be done by a one or multi-step process forging from various magnesium alloys. Wheels produced by this method are usually of higher toughness and ductility than aluminum wheels, although the costs are much higher. High and low pressure die casting uses a die arranged in a large machine that has high closing force to clamp the die closed. Gravity casting of magnesium wheels has been a production method since the 1920s and provides good ductility and other properties above what can be achieved by aluminum casting.

All the exposed wheels of high performance vehicles or other vehicles where brake temperature is an important consideration can utilize wheels having integrated cooling system 50 formed therein. The general configuration of the brake cooling system 50 is such as to enhance air flow from the external side to the internal side, upon rotation of a wheel on which the cooling system 50 is integrally formed and provided. Air flow is thus directed into a space between a wheel hub or wheel end assembly 1 (see FIG. 1) and the wheel 10, in its operative configuration, so that the braking mechanism associated with the vehicle wheel can be effectively air cooled upon heating thereof. The overall profile of the brake cooling system 50 is such that air resistance is minimized.

It is believed by the Applicant that such cooling can be rendered more effective than the cooling that conventionally occurs as a result of air flow over vehicle wheel hubs, during vehicle motion. The design of the vane formations or apertures 52 is clearly significant important in order to render brake cooling most efficient. However, the present invention should not be limited to the exact structure and configuration shown in FIGS. 1-3. Indeed, the apertures 52 may take many forms so long as they provide air flow directed toward the brake system 4 without causing unwanted vibration, resistance and/or noise. In the preferred embodiment, the cooling apertures are disposed circumferentially around the outer lip 18 and radially outside the spokes 16. The number of apertures 52 will vary depending on the wheel type and size. Additionally, the cooling aperture may be repositioned radially inside the outer lip 18 nut inside the terminal outer limit of the spokes 16. In an alternate arrangement, cooling apertures 52 may be provided as a more than one series of circumferential apertures; for example, a first series of circumferential apertures 52 may be located outside the outer lip 18 and a second series of circumferential apertures may be located inside the outer lip 18 so long as both series are disposed radially outside the spokes 16.

It is also believed by the Applicant that wheel cooling system 50 will significantly enhance the appearance of a vehicle on which they are fitted. Markings can also be applied on the external side of the wheel 10 and particularly on the exposed surface of the central bore and cover center cap. Such markings will further enhance the aesthetic appeal of the wheel trim and the vehicle as a whole.

The exact configuration of the brake cooling system 50, in accordance with the invention is clearly greatly variable and the invention extends also to alternative configuration brake cooling system trims which include the essential features of the cooling system as are disclosed herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

The invention claimed is:

1. A wheel for cooling a brake assembly of a vehicle, said wheel comprising:
    a barrel for mounting a tire thereon, said barrel extending from an outboard face to an inboard rim edge and defining a chamber radially inside said barrel, said chamber located adjacent a brake assembly of the vehicle when said wheel is mounted to the vehicle to rotate about an axis of rotation;
    a center disc having a center bore and a plurality of lug holes for receiving a wheel end to mount the wheel to the vehicle;
    a plurality of spokes interconnecting the center disc to the barrel; and
    a plurality of cooling passageways integrally formed with said barrel, said spokes and said center disc, said plurality of passageways disposed circumferentially around and radially outside the spokes, said cooling passageways extending a length from said outboard face to a location inside said barrel to direct air into said chamber through said passageways when the wheel is in rotation;
    wherein the plurality of cooling passageways are angled in a circumferential direction along the length from the outboard face to the location inside the barrel, and
    wherein the plurality of cooling passageways are angled in a radially inward direction along the length from the outboard face to the location inside the barrel.

2. The wheel according to claim 1, further comprising an outer lip extending axially away from said plurality of spokes toward said outboard face to define an inwardly facing surface toward said axis of rotation.

3. The wheel according to claim 2, wherein said plurality of passageways comprises at least 20 passageways circumscribing said outer lip and said plurality of spokes.

4. The wheel according to claim 1, wherein said plurality of passageways direct said air radially inside of said barrel and toward said axis of rotation.

5. The wheel according to claim 1, wherein the wheel is an integrally formed wheel and said plurality of passageways are manufactured of one-piece construction with said barrel and said spokes.

6. The wheel according to claim 1, wherein each of said plurality of passageways comprises a substantially oval outer opening and extends from the outboard face of said wheel to a substantially oval inner opening disposed on an inner face of said wheel, wherein the substantially oval outer opening comprises an angled edge to draw air into said passageway.

7. The wheel according to claim 6, wherein said substantially oval outer opening is radially outside said spokes and said substantially oval inner opening is radially inside of a radially outer terminal end of said spokes.

8. The wheel according to claim 1, wherein each of said plurality of spokes is formed with a substantially identical symmetrical shape, each of said plurality of spokes being separated by an opening that is symmetrical in shape.

9. A wheel for cooling a brake mechanism of a vehicle, said wheel comprising:
    a barrel for mounting a tire thereon, said barrel extending from an outboard face to an inboard rim edge and defining a chamber radially inside said barrel, said chamber at least partially surrounding a brake mechanism of the vehicle when said wheel is mounted to the vehicle to rotate about an axis of rotation;
    a center disc having a center bore and a plurality of lug holes for mounting said wheel to a wheel end of the vehicle;
    a plurality of symmetrical, radially disposed spokes interconnecting the center disc to the barrel, said plurality of spokes having a radial inner end terminating at said center disc and a radial outer end terminating at said barrel, wherein openings are disposed between each of said plurality of spokes;
    a plurality of cooling passageways integrally formed with said barrel, said plurality of passageways disposed circumferentially around and radially outside the spokes, said cooling passageways extending a length from said outboard face to a location inside said barrel to direct air into said chamber through said passageways when the wheel is in rotation, wherein said plurality of passageways are angled in both a circumferential direction and a radially inward direction along the length from said outboard face to the location inside said barrel to maximize airflow toward said brake mechanism.

10. The wheel according to claim 9, further comprising:
an outer lip extending axially away from said plurality of spokes toward said outboard face to define an inwardly facing surface toward said axis of rotation.

11. The wheel according to claim 9, wherein the location inside said barrel is axially outward relative to an axially inward termination point of the center disc.

12. A wheel cooling system comprising:
a wheel having a center bore, a barrel extending axially inward from an outer lip to an inboard rim, spokes extending radially outward from the center bore to the outer lip of the barrel, and a plurality of cooling passageways;

wherein each cooling passageway of the plurality of cooling passageways extends for a cooling passageway length running from an outer opening to an inner opening, wherein the outer opening is located on the outer lip of the barrel, wherein the outer opening is circumferentially offset from the inner opening such that the cooling passageway is angled in a circumferential direction about the barrel, wherein the outer opening is radially offset from the inner opening such that the cooling passageway is angled in a radially inward direction toward the center bore, and wherein the outer opening is axially offset from the inner opening such that the cooling passageway extends a distance axially inward along the barrel toward the inboard rim.

13. The wheel cooling system according to claim 12, wherein each cooling passageway directs air from the outer opening to the inner opening, such that the directed air travels radially inward toward the center bore and travels axially inward toward the inboard rim.

14. The wheel cooling system according to claim 12, wherein the outer opening is located radially outward relative to the spokes and the inner opening is located radially inward relative to a radially outward portion of the spokes.

15. The wheel cooling system according to claim 12, wherein the outer opening is located axially outward relative to an axially outward portion of the spokes and the inner opening is located axially inward relative to the axially outward portion of the spokes.

16. The wheel cooling system according to claim 12, wherein the inner opening provides air in the vicinity of a braking mechanism located inside the barrel.

17. The wheel cooling system according to claim 16, wherein the braking mechanism is located radially inward toward the center bore with respect to the outer opening and axially inward toward the inboard rim with respect to the outer opening.

18. The wheel cooling system according to claim 12, wherein the spokes extend axially inward toward the inboard rim as the spokes extend radially inward toward the center bore, further wherein the spokes extend axially inward toward the inboard rim further than the cooling passageway.

19. The wheel cooling system according to claim 18, wherein the inner opening is located axially outward relative to the center bore such that the directed air is provided behind a radially outward portion of the spokes.

20. The wheel cooling system according to claim 12, wherein the center bore is located axially inward relative to both the outer opening and the inner opening.

\* \* \* \* \*